(12) United States Patent
Neville, Jr. et al.

(10) Patent No.: US 6,181,552 B1
(45) Date of Patent: Jan. 30, 2001

(54) COMPUTER ASSEMBLY

(76) Inventors: Robert J. Neville, Jr., 174 Millville Rd., Mendon, MA (US) 01756; Maida Boudreau, 1569 Brimfield Rd., Brimfield, MA (US) 01010; William Depatie, 9 Jackson St., Hopkinton, MA (US) 01748; Phil Lariviere, 82 Winter St., Woonsocket, RI (US) 02895; Rafael Yepez, 93A Hillside St., Apt. 3, Boston, MA (US) 02120

( * ) Notice: Under 35 U.S.C. 154(b), the term of this patent shall be extended for 0 days.

(21) Appl. No.: 09/181,011

(22) Filed: Oct. 27, 1998

(51) Int. Cl.[7] ........................................ G06F 1/16
(52) U.S. Cl. ..................... 361/686; 361/724; 361/725; 361/726; 361/727; 361/740; 361/741
(58) Field of Search .................... 361/724, 725, 361/726, 727, 740, 741, 686

(56) References Cited

U.S. PATENT DOCUMENTS 5,450,271 * 9/1995 Fukushima et al. ................. 361/686

* cited by examiner

Primary Examiner—Leo P. Picard
Assistant Examiner—Yean-Hsi Chang
(74) Attorney, Agent, or Firm—Kriegsman & Kriegsman

(57) ABSTRACT

A computer assembly comprises a base frame which is generally U-shaped in cross-section and a box-shaped primary unit console which is fixedly mounted on the base frame. The secondary unit comprises a secondary unit console which is slidably mounted on the base frame of the primary unit about a pair of ball bearing slides. A plurality of power supplies are slidably disposed within the primary unit console, each power supply comprising a housing, power supply electronics disposed within the housing and a handle assembly pivotally mounted on the housing. A power switch assembly is mounted on the base frame of the primary unit and comprises a T-shaped metal pawl coupled to a power knob. In use, the metal pawl can be rotated by the power knob between a first position in which the metal pawl electrically and mechanically engages a locking block formed on the secondary unit console and a second position in which the metal pawl electrically and mechanically disengages from the locking block. With the secondary unit console disengaged from the primary unit console, electronic components held within the secondary unit console can be accessed for upgrading or replacement over the life of the computer assembly through a pivotable access panel.

11 Claims, 8 Drawing Sheets

COMPUTER ASSEMBLY

BACKGROUND OF THE INVENTION

The present invention relates generally to computers and more particularly to computers which are used as network servers.

Computers, such as personal computers, are often connected to a communication network, such as the internet, so as to enable information (i.e., data or files) to be passed from one computer to another computer. When large amounts of information are shared by multiple computers, a network server, or server, is often connected to the communication network to provide information to numerous network clients, or clients.

A server enables many individual clients to access information that is stored within the single server. For example, servers are commonly used to host web sites which can be accessed by many individual computers through the internet.

The establishment of a client-server computer network creates numerous advantages. For example, a client-server relationship enables multiple clients to concurrently access information stored on a single server. In addition, a client-server relationship enables information to be added or modified to the single server rather than to each of the individual clients, thereby reducing the overall cost to maintain the system.

One type of server which is well-known and which is commonly used in commerce is the AViiON dual processor high-density server, model AV20000, which is manufactured by Data General Corporation of Westborough, Mass.

Pluralities of individual servers are often disposed within a rack console, or cabinet, in a stacked relationship. Rack consoles are generally rectangular in shape and are constructed to enable components, such as servers or disc array subsystems, to be slidably disposed therewithin. Rack consoles are typically constructed to house components which have a width which complies with industry NEMA standards (i.e., 19 inches). Rack consoles are also typically constructed to house components which have a height which complies with industry NEMA standards (i.e., a 3-U height of approximately 5.25 inches).

Significant levels of progress are constantly being made in the art of computer technology. In particular, the capabilities of certain individual computer components (i.e., microprocessor chips, memory boards, and input/output boards) are constantly being improved. The rapid level of advancement being achieved in the art of computer technology enables computers to perform at a significantly higher level (i.e., faster and with more memory).

However, it should be noted that computers are not typically designed to allow for component upgrading. Rather, advances in computer technology typically require a consumer to purchase an entirely new computer. Due to the significantly expensive cost of computers, consumers are generally unable to repeatedly purchase entirely new computer systems and, as a consequence, are unable to take advantage of the constant progress made in computer technology.

Accordingly, it is an object of the present invention to provide a new and improved computer assembly.

It is also an object of the present invention to provide a computer assembly having readily upgradable capabilities.

It is another object of the present invention to provide a computer assembly as described above which is relatively inexpensive to upgrade.

It is yet another object of the present invention to provide a computer assembly as described above which can be disposed within a rack console.

It is still another object of the present invention to provide a computer assembly as described above which can be slidably withdrawn from a rack console for accessing.

It is another object of the present invention to provide a computer assembly as described above which can be slidably withdrawn from a rack console for accessing without creating instability in the rack console.

It is yet another object of the present invention to provide a computer assembly as described above which has a limited number of parts, which is inexpensive to manufacture and which is easy to use.

SUMMARY OF THE INVENTION

Accordingly, there is provided a computer assembly comprising a primary unit, and a secondary unit mounted on said primary unit, said secondary unit being releasably electrically coupled with said primary unit.

Various other features and advantages will appear from the description to follow. In the description, reference is made to the accompanying drawings which form a part thereof, and in which is shown by way of illustration, a specific embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

A fuller understanding of the nature and objects of the present invention will become apparent upon consideration of the following detailed description taken in connection with the accompanying drawings, wherein like reference numerals represent like parts.

DETAILED DESCRIPTION OF THE PREFERRED EMBODIMENT

Figure 1:
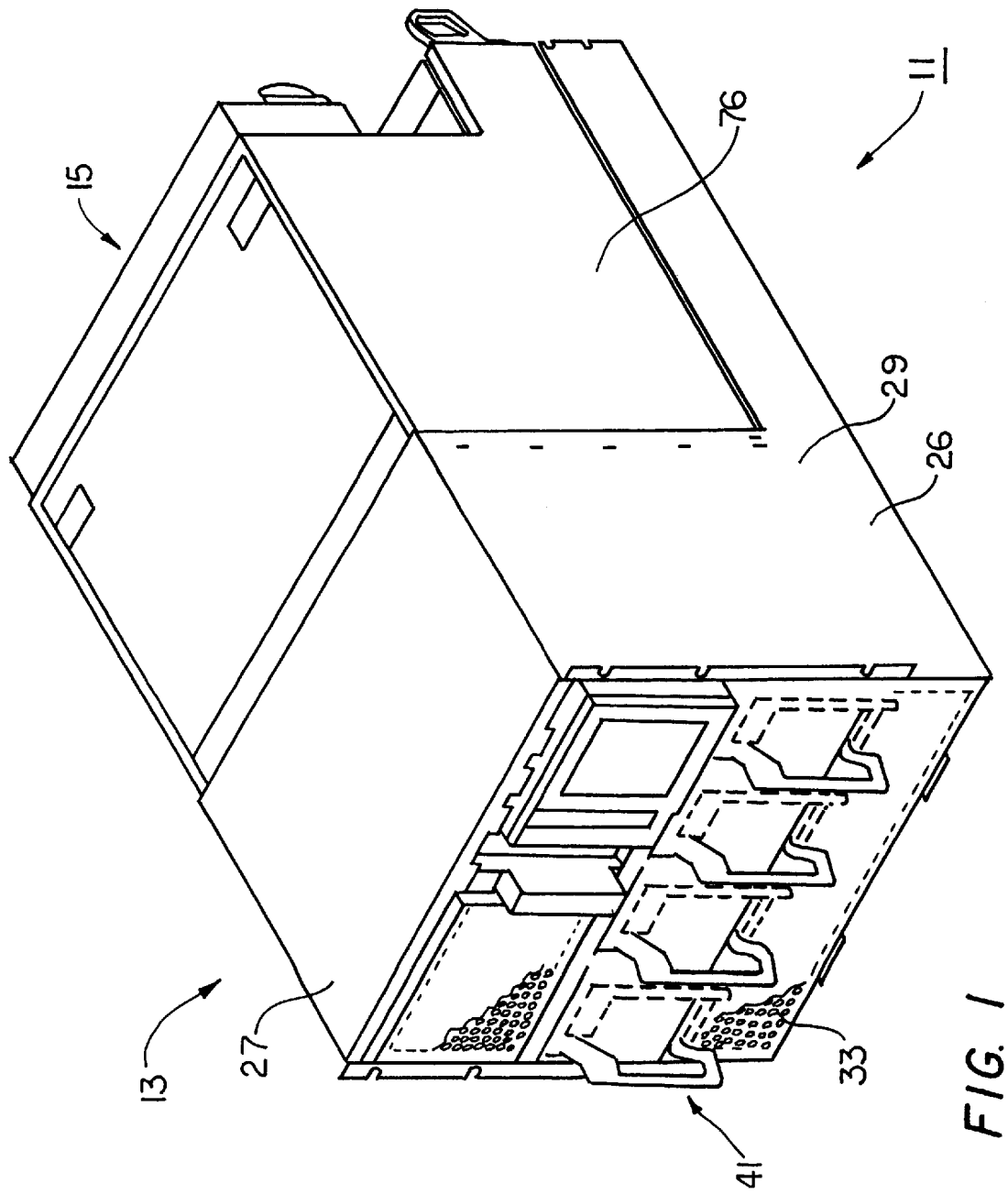
FIG. 1 is a front perspective view of a computer assembly constructed according to the teachings of the present invention, the secondary unit console being shown engaged with the primary unit console.

Referring now to the drawings, there is shown a computer assembly constructed according to the teachings of the present invention, the computer assembly being identified generally by reference numeral 11.

Computer assembly 11 is sized and shaped to be slidably disposed within a generally rectangular rack console, or cabinet. Preferably, computer assembly 11 is sized and shaped to be slidably disposed within a rack console which is constructed to meet NEMA industry size and dimension standards (i.e., a 19 inch NEMA rack console).

Computer assembly 11 comprises a primary unit 13 and a secondary unit 15 slidably mounted on primary unit 13. As will be described further in detail below, secondary unit 15 is slidably mounted on primary unit 13 in such a manner so as to permit both electrical and mechanical engagement disengagement of secondary unit 15 with primary unit 13. With secondary unit 15 engaged with primary unit 13, computer assembly 11 functions as a computer and preferably functions as a computer server for a communication network.

It should be noted that primary unit 13 is a fixed unit which comprises electronic components which typically remain constant throughout the life of computer assembly 11. To the contrary, secondary unit 15 is a satellite unit disengagable from primary unit 13 and comprises electrical components which may require frequent upgrading over the life of computer assembly 11.

Primary unit 13 comprises a base frame 17 and a generally box-shaped primary unit console 19 which is fixedly mounted on base frame 17. It should be noted that although primary unit 13 is shown with primary unit console 19 fixedly mounted on base frame 17, primary unit console 19 and base frame 17 could alternatively be constructed as an integral structure without departing from the spirit of the present invention.

Base frame 17 is constructed of a rigid and durable material, such as sheet metal. Base frame 17 is generally U-shaped in cross section and comprises a flat bottom panel 21 and a pair of upwardly standing sidewalls 23 and 25. Primary unit console 19 is fixedly mounted on flat bottom panel 21 of base frame 17 within upwardly standing sidewalls 23 and 25.

Primary unit 13 further comprises a protective housing 26 affixed over a portion of base frame 17 and primary unit console 19. Protective housing 26 comprises a top panel 27 mounted on primary unit console 19, a partially open rear panel 28 mounted on primary unit console 19 and a pair of side panels 29 and 31 which are mounted on primary unit console 19 and on sidewalls 23 and 25, respectively, of base frame 17.

Primary unit console 19 also comprises a peripheral control/panel interconnect unit receptacle 32-1 and a plurality of power interconnect pins 32-2 which protrude out from partially open rear panel 28. As will be described further in detail below, interconnect unit receptacle 32-1 and pins 32-2 serve to electrically and mechanically couple primary unit 13 with secondary unit 15. Primary unit console 19 further comprises a pair of elongated projections 32-3 which protrude out from partially open rear panel 28.

Protective housing 26 further comprises a front panel 33 mounted on primary unit console 19 which is shaped to include various sized openings 35 into which infrequently upgradable components are disposed. Specifically, front panel 33 is shaped to comprise openings 35 into which a control panel 37, disc drives (or other similar peripherals) 39 and power supplies 41 can be disposed.

It should be noted that primary unit 13 additionally includes a power button (not shown), a non-mathematical interrupt (or NMI) button (not shown), a reset button (not shown) and a electrical switch lock (not shown) which are all disposed on front panel 33 of primary unit console 19. The electrical switch includes three switching positions, namely, a first switching position in which all three buttons can be used to program computer assembly 11, a second switching position in which a keyboard (not shown) coupled to primary unit console 19 can be used to program computer assembly 11, and a third switching position which prevents the three buttons and the keyboard from being used to program computer assembly 11.

Computer assembly 11 is shown with four power supplies 41 slidably disposed within openings 35 in front panel 33 of primary unit console 19. However, it is to be understood that different numbers of power supplies 41 could be used to provide power for computer assembly without departing from the spirit of the present invention. It should also be noted that power supplies 41 are connected in an "n+1" connective manner, thereby enabling one individual power supply 41 to be slid out from primary unit console 19 without causing system power failure for computer assembly 11.

The particular construction of each power supply 41 allows for easy insertion into and withdrawal from primary unit housing 19 and accordingly, serves as a feature of the present invention. Specifically, power supply 41 comprises a generally rectangular housing 43, power supply electronics (not shown) which are well-known in the art and which are disposed within housing 43 and a handle assembly 45 pivotally mounted on housing 43.

Housing 43 is constructed of a rigid and durable material, such as sheet metal, and comprises a top panel 47, a bottom panel 48, a pair of side panels 49 and 51, a front panel 53 and a rear panel 55. A plurality of connection pins 56 electrically connected to the electronics for power supply 41 protrude outward from rear panel 55 and serve to mechanically and electrically connect power supply 41 to primary unit console 19.

Figure 4:
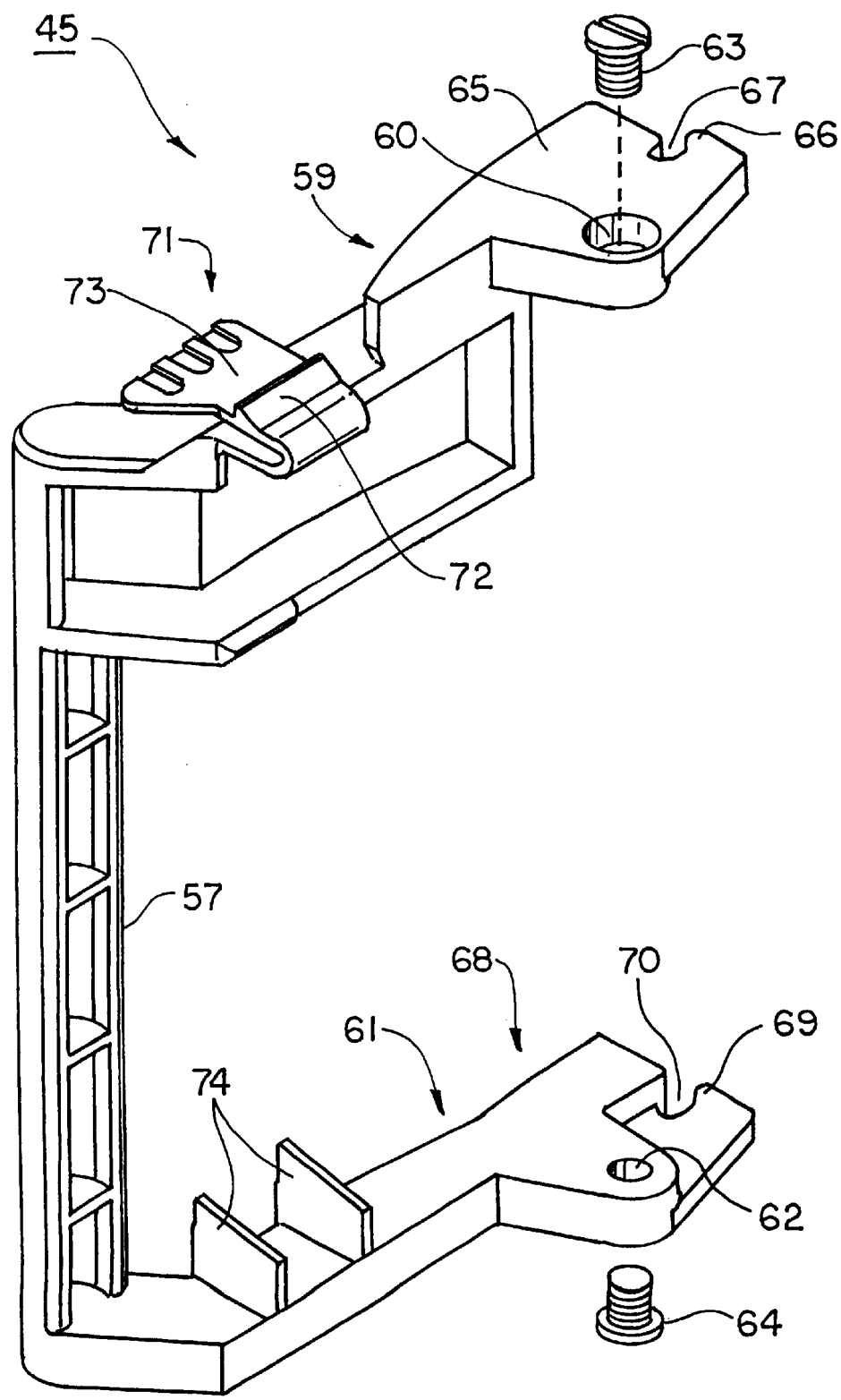
FIG. 4 is an enlarged, top, exploded, perspective view of one of the handle assemblies shown in FIG. 1.

Referring now to FIG. 4, handle assembly 45 comprises a generally U-shaped handle 57 constructed of a rigid material, such as plastic. Handle 57 includes a first end 59 having a hole 60 approximately 4.88 mm in diameter formed therein and a second end 61 having a hole 62 approximately 4.88 mm in diameter formed therein. Handle assembly 45 further comprises a first threaded screw 63 which is disposed through hole 60 to pivotally mount first end 59 of handle 57 onto top panel 47 and a second threaded screw 64 which is disposed through hole 62 to pivotally mount second end 61 of handle 57 onto bottom panel 48.

First end 59 of handle 57 is shaped to include an integrally formed, enlarged hinge member 65, hinge member 65 comprising a latching cam 66 and semi-circular notch 67. Similarly second end 61 of handle 57 is shaped to include an integrally formed, enlarged hinge member 68, hinge member comprising a latching cam 69 and a semi-circular notch 70.

Handle 57 also comprises an integrally formed locking member 71 proximate first end 59. Locking member 71 is generally C-shaped in cross-section and is constructed of a resilient, flexible plastic so as to permit limited inward compressibility. Locking member 71 is shaped to include an angled locking tab 72 having an angle of approximately 30 degrees and a flat, thumb depression surface 73 which enables the user to inwardly compress locking member 71. Handle 57 additionally comprises a pair of integrally formed, rib stops 74 proximate second end 61.

Figure 3:
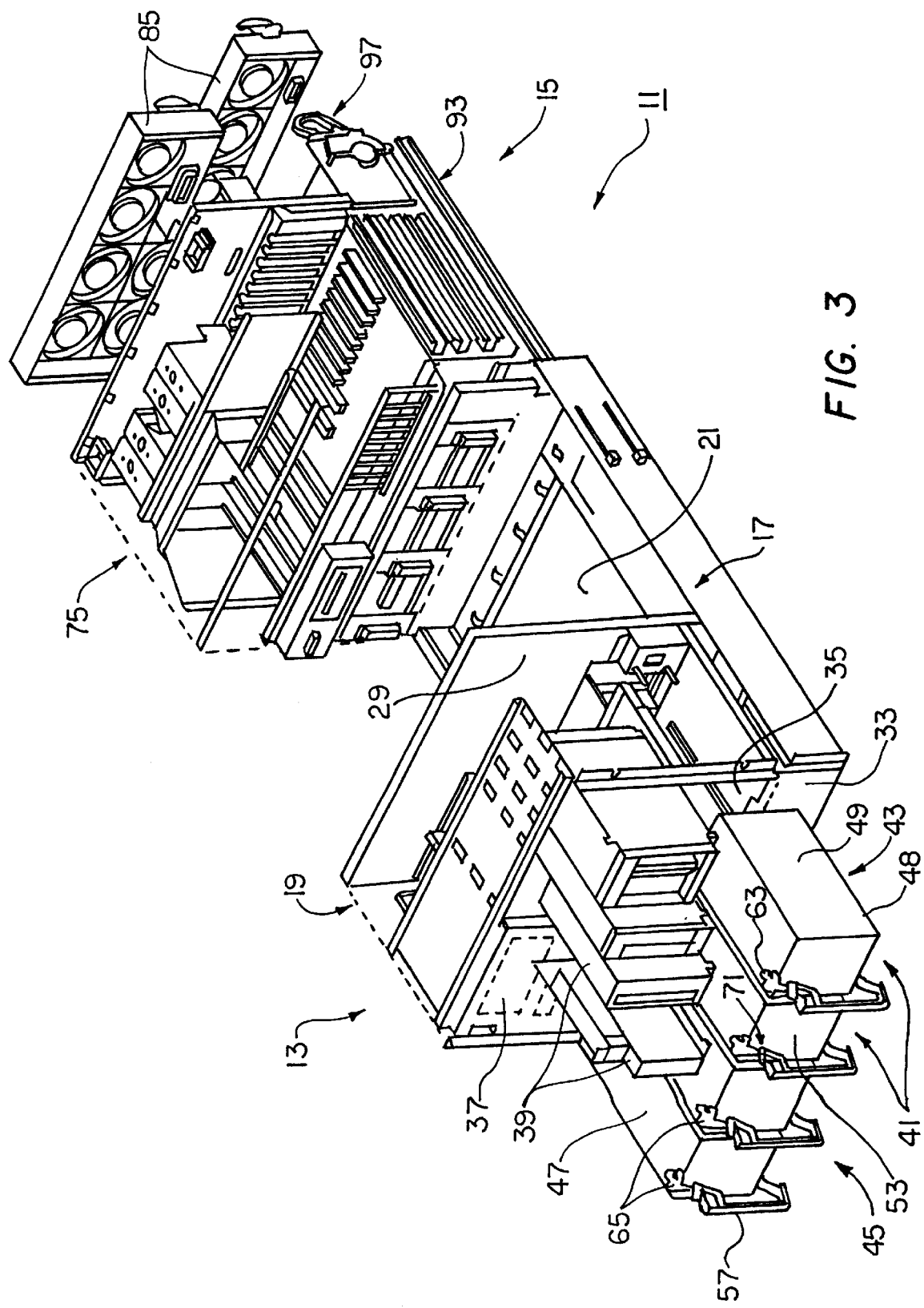
FIG. 3 is a front, partially exploded view of the computer assembly shown in FIG. 2, the computer assembly being shown without the protective housing for the primary and secondary units.

In use, power supply 41 can be disposed within primary unit housing 19 in the following manner. Handle 57 of handle assembly 45 is pivoted in a clockwise direction until handle 57 is generally perpendicular with front panel 53 of housing 43, as shown in FIG. 3. Power supply 41 is then slidably disposed within an associated opening 35 in front panel 33 so that enlarged hinge members 65 and 68 of handle 57 align within corresponding hinge member recesses (not shown) which are formed in front panel 33 of primary unit console 19. As can be appreciated, handle 57 of handle assembly 45 serves as gripping means for sliding power supply 41 into primary unit console 19.

With power supply 41 disposed within primary unit console 19, handle 57 is pivoted in a counterclockwise direction to lock power supply 41 within housing 19. Rotation of handle 57 causes a portion of front panel 33 of console 19 to protrude within notches 67 and 70. In addition, rotation of handle 57 cause latching cams 66 and 69 to grasp a portion of front panel 33 to maintain power supply 41 within primary unit console 19.

Figure 2:
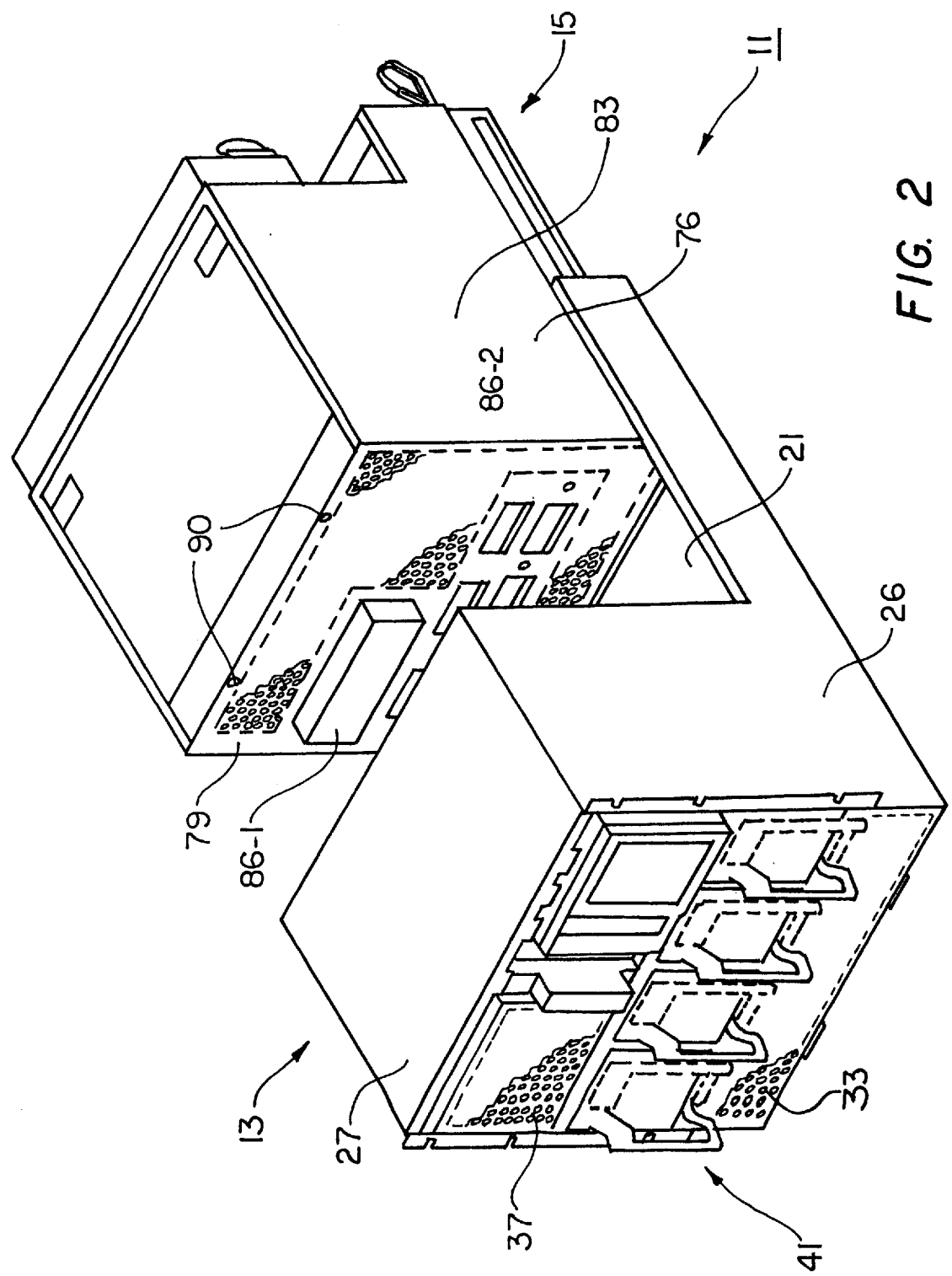
FIG. 2 is a front perspective view of the computer assembly shown in FIG. 1, the secondary unit console being shown disengaged from the primary unit console.

While depressing thumb depression surface 73 so as to inwardly compress locking member 71, handle 57 can be further rotated until locking member 71 is disposed securely within a locking member recess (not shown) formed in front panel 33 of primary unit console 19, as represented by dashed lines in FIGS. 1 and 2. Rib stops 73 abut against the surface of front panel 33 to prevent further rotation of handle 57 once locking member 71 is disposed within its associated locking member recess. With locking member 71 securely disposed within an associated locking member recess, the user releases inward compression pressure on depression surface 73 which causes resilient locking member 71 to return to is original C-shaped cross-section which, in turn, causes angled locking tab 72 to abut against front panel 33, thereby locking power supply 41 within console 19.

To remove power supply 41 from console 19, the user is required to apply a downward force on depression surface 73, rotate handle 57 in a clockwise direction until locking member 71 is disengaged from the locking member recess formed in front panel 33, and slide power supply 41 away from primary unit console 19. It should be noted that the angled construction of locking tab 72 serves to project power supply 41 out from console 19, thereby assisting the user in removing power supply 41. It should also be noted that a limited amount of torque is required to pivot handle 57, thereby facilitating the ease in lockably disposing and removing power supply 41 within console 19.

Secondary unit 15 comprises a generally box-shaped secondary unit console 75 which is slidably mounted on base frame 17 of primary unit 13. Secondary unit 15 further comprises a protective housing 76 which is affixed over secondary unit console 75. Protective housing 76 comprises a top panel 77 having an access A, opening 78 formed therein, a partially open front panel 79, a partially open rear panel 81 and a pair of side panels 83 and 84.

Secondary unit console 75 includes a pair of fan packs 85 which are removably mounted on partially open rear panel 81 and which serve to cool the interior of secondary unit console 75. In addition, secondary unit console 75 comprises an interconnect unit 86-1 and a plurality of power interconnect pin receptacles 86-2 which protrude out from partially open front panel 79. As can be appreciated, interconnect unit 86-1 is sized and shaped to matingly engage within receptacle 32-1 and interconnect pins 32-2 are sized and shaped to matingly engage within pin receptacles 86-2 so as to electrically and mechanically couple primary unit console 19 with secondary unit console 75.

Protective housing 76 further comprises an access panel 87 which is pivotally connected to top panel 77 about a pair of pins 88 so as to removably cover access opening 78, access panel 87 including a pair of slidable locking tabs 89 which releasably grasp top panel 77 so as to lock access panel 87 in a closed position over access opening 78. Protective housing 76 is also shaped to include a pair of elongated projection bores 90 which protrude in through front panel 79, top panel 77 and access panel 87. As will be described in further detail below, projections 32-3 on primary unit 13 protrude into elongated projection bores 90 when secondary unit console 75 is coupled with primary unit console 19, projections 32-3 serving to lockably retain access panel 87 in a closed position over access opening 78.

A first pair of ball bearing slides 93 are affixed to side panel 83 of protective housing 76 and sidewall 23 of base frame 17. A second pair of ball bearing slides 95 are affixed to side panel 84 of protective housing 76 and sidewall 25 of base frame 17. Together slides 93 and 95 enable secondary unit console 75 to be slid and locked in a fixed position away from primary unit console 19. Furthermore, slides 93 and 95 also enable for secondary unit console 75 to be slid towards primary unit console 19 until secondary unit console 75 is mechanically and electrically coupled to primary unit console 19, in the manner described above. Specifically, secondary unit console 75 can be slid towards primary unit console 19 so that interconnect unit 86-1 is matingly engaged within receptacle 32-1 and so that interconnect pins 32-2 are matingly engaged within pin receptacles 86-2. Positioned as such, projections 32-3 of primary unit console 19 protrude into elongated projection bores 90 of access panel 87, thereby lockably retaining access panel 87 in a closed position over access opening 78 and precluding access to the numerous electrical components housed within secondary unit console 75.

A pair of lock release ejector handles 97 mounted on partially open rear panel 81 are mechanically coupled to ball bearing slides 93 and 95 and serve to release secondary unit console 75 from a stationary position, handles 97 thereby enabling secondary unit console 75 to be slid towards or away from primary unit console 19.

Secondary unit console 75 is sized and shaped to enable various electronic components to be disposed therewithin. In particular, electronic components which are routinely upgraded during the life of computer assembly 11 are disposed within secondary unit console 75. For example, electronic components, such as microprocessors, memory boards and input/output (IO) boards are disposed within secondary unit console 75. The various electronic components which are disposed within console 75 can be removed and replaced with upgraded components only by separating secondary unit console 75 from primary unit console 19. With secondary unit console 75 separated from primary unit console 19, access to the various electronic components contained within secondary unit console 75 is provided through access opening 78 formed in top panel 77 and partially open front panel 79.

Figure 5:
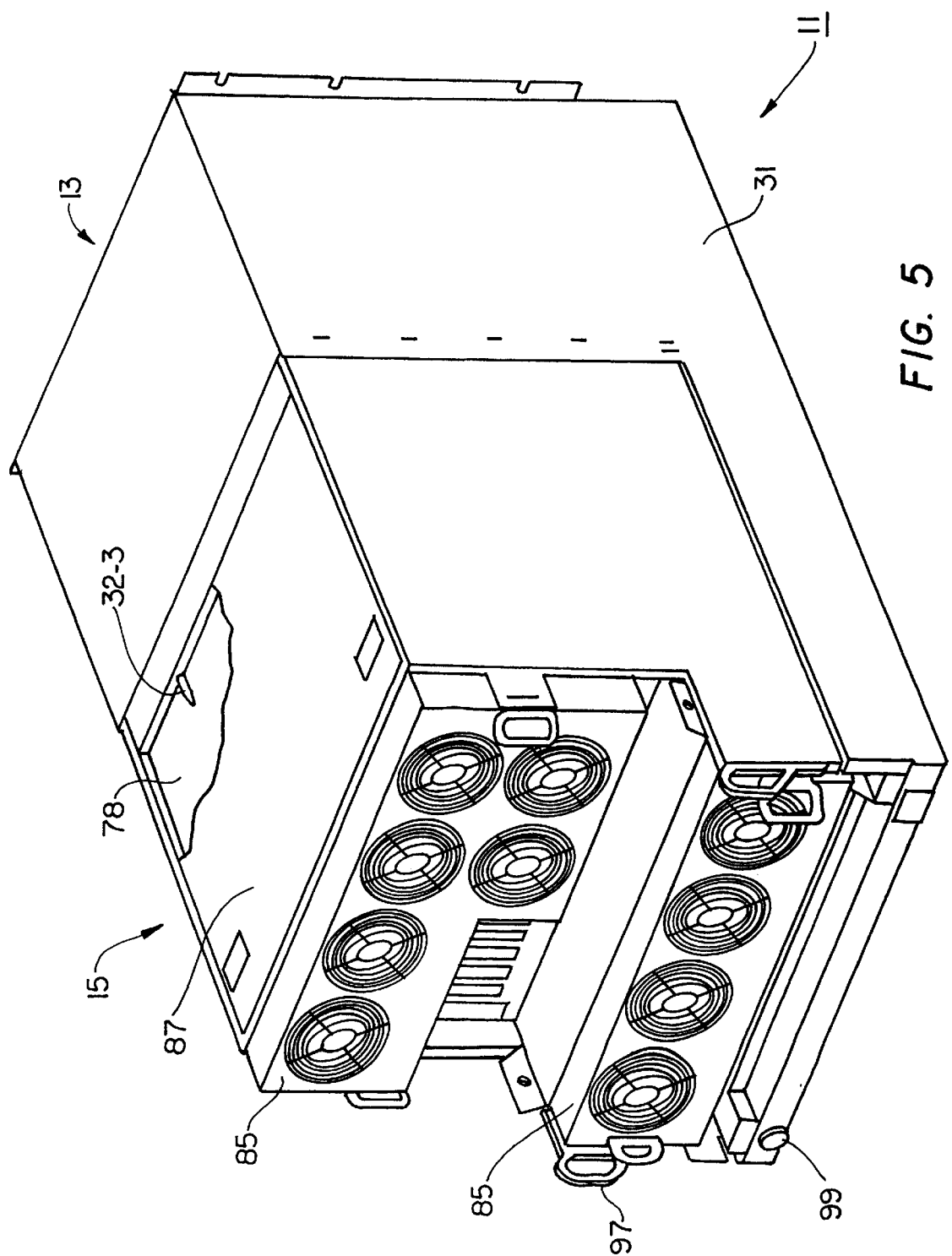
FIG. 5 is a rear perspective view of the computer assembly shown in FIG. 1, the access panel being shown partially broken away.
Figure 6:
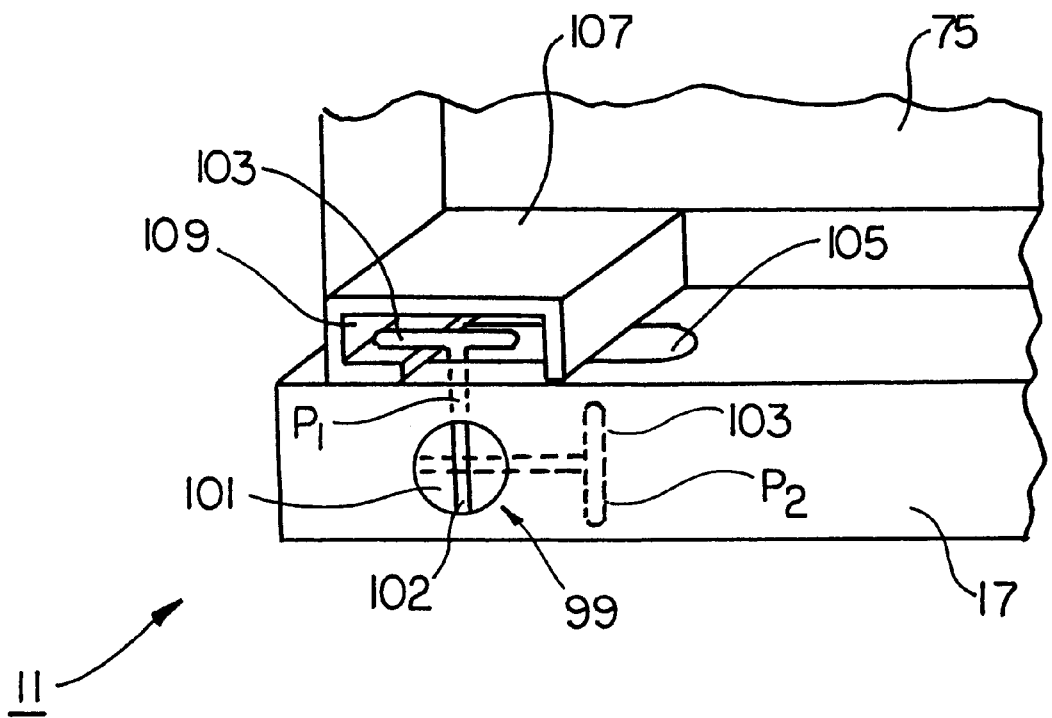
FIG. 6 is an enlarged, rear perspective view, broken away in part, of the computer assembly shown in FIG. 5.
Figure 7:
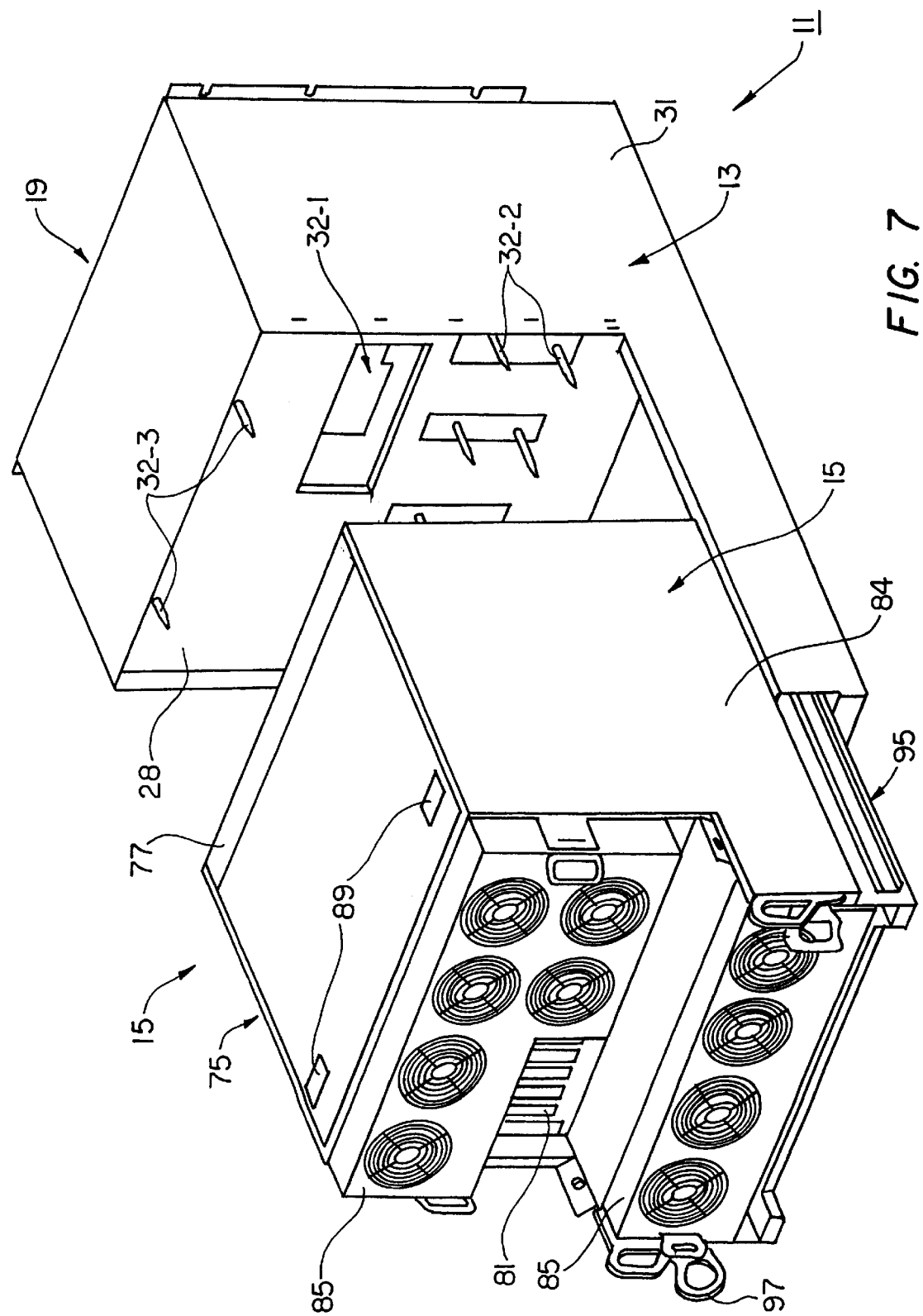
FIG. 7 is a rear perspective view of the computer assembly shown in FIG. 5, the secondary unit console being shown disengaged from the primary unit console.
Figure 8:
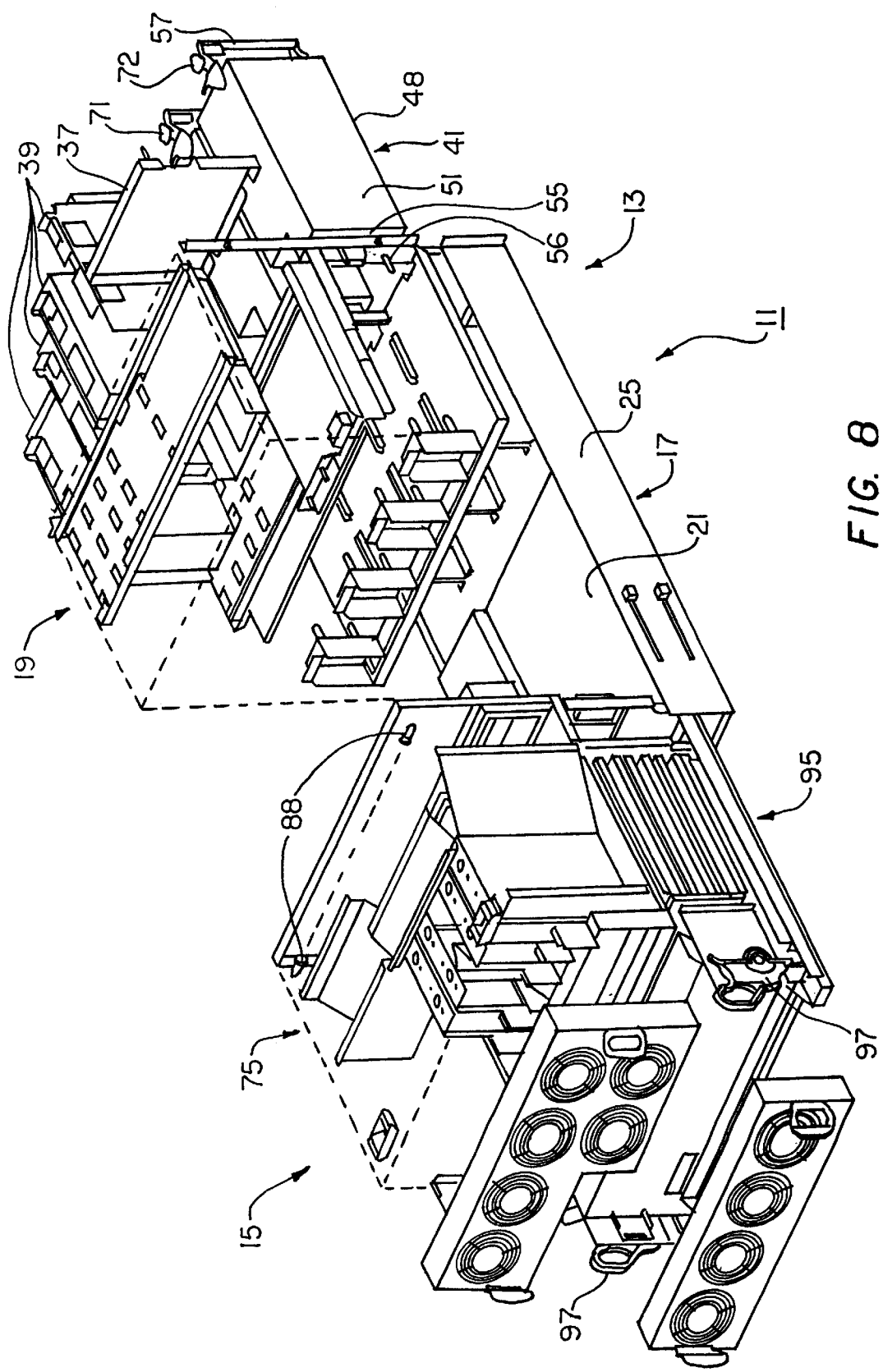
FIG. 8 is a rear, partially exploded view of the computer assembly shown in FIG. 7, the computer assembly being shown without the protective housing for the primary and secondary units.

Referring now to FIGS. 5 and 6, base frame 17 of primary unit 13 comprises a power switch assembly 99 which serves to releasably lock secondary unit console 75 in mechanical and electrical engagement with primary unit console 19. Specifically, power switch assembly 99 comprises a power knob 101 which can be rotated between a first position $P_1$ and a second position $P_2$. Power knob 101 includes a key-shaped bore 102 therethrough which limits the rotation, and accordingly the activation and deactivation, of power switch assembly 99 to only those individuals who have access to a particular key (not shown) for computer assembly 11.

Power knob 101 is coupled to a generally T-shaped, metal pawl 103. Rotation of power knob 101 accordingly causes metal pawl 103 to rotate. As shown in FIG. 6, with power knob 101 rotated to first position $P_1$, metal pawl 103 extends in a substantially vertical position and protrudes through an elongated slot 105 formed in base frame 17 of primary unit 13. With power knob 101 rotated to first position $P_1$, metal pawl 103 extends in a substantially vertical position and engages a locking block 107 integrally formed on partially open rear panel 81 of secondary unit console 75. Locking block 107 is generally C-shaped in lateral cross-section and includes a metal contact surface 109. As will be described in detail below, with metal pawl 103 extending in a substantially vertical position, pawl 103 engages metal contact surface 109 so as to mechanically and electrically couple secondary unit console 75 with primary unit console 19.

In use, power switch assembly 99 functions in the following manner. The key for computer assembly 11 is used to rotate power knob 101 to first position $P_1$. With power knob 101 positioned as such, metal pawl 103 is orientated in a generally vertical position and protrudes through elongated slot 105. Positioned in this manner, metal pawl 103 engages metal contact surface 109 of locking block 107. As can be appreciated, metal pawl 103 serves as connection means for electrically coupling secondary unit console 75 with primary unit console 19, metal pawl 103 serving as a necessary connector for providing computer assembly 11 with enough power to operate.

With power knob 101 positioned to first position $P_1$, metal pawl 103 additionally serves to engage locking block 107 and therefore lock secondary unit console 75 in engagement with primary unit console 19. It should be noted that lockably engaging secondary unit console 75 with primary unit console 19 precludes access to the electrical components held within secondary unit console 75, for reasons noted above in conjunction with elongated projections 32-3.

Using the key for computer assembly 11, power knob 101 can be rotated to second position $P_2$. With power knob 101 positioned as such, pivotable metal pawl 103 is orientated in a generally horizontal position. As such, metal pawl 103 is disengaged from locking block 107 of secondary unit console 75. Disengaging metal pawl 103 from locking block 107 serves to disconnect the electrical connection between secondary unit console 75 with primary unit console 19, thereby eliminating the necessary flow of electricity to power computer assembly 11. Furthermore, disengaging metal pawl 103 from locking block 107 additionally serves to unlock secondary unit console 75 from primary unit console 19. With secondary unit console 75 unlocked from primary unit console 19, secondary unit console 75 can be disengaged and separated from primary unit console 19 using lock release ejector handles 97, thereby enabling an operator to access the electrical components held within secondary unit console 75 through access panel 87.

The embodiment shown in the present invention is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A computer assembly comprising:
   (a). a primary unit comprising a base frame and a primary unit console fixedly mounted on said base frame, and
   (b). a secondary unit comprising a secondary unit console slidably mounted on the base frame of said primary unit, said secondary unit console being movable between a first position in which said secondary unit console is electrically and mechanically engaged wilt said primary unit console and a second position in which said secondary unit console is electrically and mechanically disengaged with said primary unit console, the secondary unit console comprising a locking block,
   (c). the base frame of said primary unit comprising a power switch assembly for selectively locking the secondary unit console in mechanical engagement with the primary unit console, the power switch assembly being capable of rotation between a first position and a second position, said power switch assembly comprising a power knob having a key-shaped bore therethrough and a T-shaped pawl coupled to said power knob, wherein the pawl mechanically engages the locking block when the power switch assembly is in its first position.

2. A computer assembly comprising:
   (a). a primary unit comprising a base frame and a primary unit console fixedly mounted on said base frame, the base frame comprising a power switch assembly rotatable between a first position and a second position, the power switch assembly comprising a metal pawl coupled to a power knob, and
   (b). a secondary unit comprising a secondary unit console slidably mounted on the base file of said primary unit, said secondary unit console being movable between a first position in which said secondary unit console is electrically and mechanically engaged with said primary unit console and a second position in which said secondary unit console is electrically and mechanically disengaged with said primary unit console, the secondary unit console comprising a locking block, the power switch assembly mechanically engaging the locking block when the power switch assembly is in its first position and the power switch assembly mechanically disengaging the locking block when the power switch assembly is in its second position,
   (c). the secondary unit console comprising an access panel which can be pivoted between and open position and a closed position and an elongated projection bore which protrudes partially into said access panel and wherein,
   (d). the primary unit console comprises an elongated projection which is sized and shaped to protrude into the elongated projection bore in said access panel when said secondary unit console is moved to its first position, said elongated projection precluding said access panel from being pivoted to its open position.

3. A computer assembly comprising:
   (a). a primary unit comprising a base frame and a primary unit console fixedly mounted on said base frame,
   (b). a secondary unit comprising a secondary unit console slidably mounted on the base frame of said primary unit, said secondary unit console being movable between a first position in which said secondary unit console is electrically and mechanically engaged with said primary unit console and a second position in which said secondary unit console is electrically and mechanically disengaged with said primary unit console, and (c). a power supply slidably disposed within the primary unit console.

4. The computer assembly of claim 3 wherein said power supply comprises a housing and a handle assembly mounted on said housing so as to pivot between a first position and a second position.

5. The computer assembly of claim 4 wherein said handle assembly comprises a handle having a first end, a second end, a first enlarged hinge member formed at the first end and a second enlarged hinge member formed at the second end.

6. The computer assembly of claim 5 wherein the first and second ends of said handle assembly are pivotally mounted on said housing.

7. The computer assembly of claim 6 wherein each of said first and second enlarged hinge members comprise a latching cam and a notch, said latching cams engaging said primary unit console when said handle is pivoted to its first position.

8. The computer assembly of claim 7 wherein said handle assembly further comprises a springed locking member having a depression surface and an angled locking tab which is sized and shaped to engage a portion of said primary unit console housing when said handle is pivoted to its first position.

9. A computer assembly comprising:

(a). a primary unit comprising a base frame and a primary unit console fixedly mounted on said base frame, and (b). a secondary unit comprising a secondary unit console slidably mounted on the base frame of said primary unit, said secondary unit console being movable between a first position in which said secondary unit console is electrically and mechanically engaged with said primary unit console and a second position in which said secondary unit console is electrically and mechanically disengaged with said primary unit console, (c). said secondary unit including an access opening formed therein and a pivotally mounted access panel which selectively covers the access opening, said computer assembly being adapted to lockably retain the access panel in a closed position over the access opening when said secondary unit console is moved into its first position.

10. The computer assembly of claim 9 wherein said secondary unit is shaped to include an elongated projection bore which protrudes partially into the access panel.

11. The computer assembly of claim 10 wherein said primary unit comprises an elongated projection which is sized and shaped to protrude into the elongated projection bore when said secondary unit console is moved to its first position, the elongated projection lockably retaining the access panel in its closed position over the access opening.

* * * * *